United States Patent
Takizawa et al.

(10) Patent No.: US 7,480,018 B2
(45) Date of Patent: Jan. 20, 2009

(54) COLOR FILTER SUBSTRATE, METHOD FOR MANUFACTURING THE SAME, LIQUID CRYSTAL DISPLAY PANEL, AND ELECTRONIC EQUIPMENT

(75) Inventors: Keiji Takizawa, Hotaka (JP); Yoshihiro Otagiri, Matsumoto (JP); Tomoyuki Nakano, Toyoshina (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 12/005,252

(22) Filed: Dec. 26, 2007

(65) Prior Publication Data

US 2008/0151155 A1 Jun. 26, 2008

Related U.S. Application Data

(60) Continuation of application No. 11/188,934, filed on Jul. 25, 2005, which is a division of application No. 10/310,636, filed on Dec. 5, 2002, now Pat. No. 6,954,241.

(30) Foreign Application Priority Data

Dec. 7, 2001 (JP) .............................. 2001-374040

(51) Int. Cl.
*G02F 1/1335* (2006.01)

(52) U.S. Cl. .................. 349/106; 349/110; 349/114

(58) Field of Classification Search ............... 349/106, 349/110, 114; 353/84; 345/589
See application file for complete search history.

(56) References Cited

U.S. PATENT DOCUMENTS

| | | | |
|---|---|---|---|
| 6,573,960 B2 | 6/2003 | Kobayashi et al. | |
| 6,608,660 B1 | 8/2003 | Okamoto et al. | ............ 349/113 |
| 6,628,357 B1 | 9/2003 | Maeda et al. | |
| 6,657,687 B2 | 12/2003 | Takizawa | |
| 6,680,765 B1 | 1/2004 | Maeda et al. | |
| 6,697,135 B1 | 2/2004 | Baek et al. | ................... 349/106 |
| 6,704,075 B2 | 3/2004 | Takizawa et al. | |
| 6,707,519 B1 | 3/2004 | Okumura et al. | |
| 6,873,383 B1 | 3/2005 | Maeda et al. | |
| 6,927,813 B2 | 8/2005 | Takizawa | |
| 6,954,241 B2 | 10/2005 | Takizawa et al. | |
| 7,092,055 B2 | 8/2006 | Maeda et al. | |
| 2004/0008300 A1 | 1/2004 | Maeda et al. | |
| 2006/0209236 A1 | 9/2006 | Maeda et al. | |
| 2006/0274241 A1 | 12/2006 | Maeda et al. | |
| 2007/0247575 A1 | 10/2007 | Maeda et al. | |

FOREIGN PATENT DOCUMENTS

JP   61-065289   4/1986

(Continued)

*Primary Examiner*—Thoi V Duong
(74) *Attorney, Agent, or Firm*—Harness, Dickey & Pierce, P.L.C.

(57) ABSTRACT

Each color filter 22 includes a deep-color portion 221 being superimposed on a translucent portion 211 of a reflection layer 21 and a light-color portion 222 having an optical density lower than that of the deep-color portion 221. A light-shielding layer 23 for shielding the gaps between individual subpixels 7 from light is a laminate composed of at least a deep-color portion 221B of a blue color filter 22B, a deep-color portion 221R of a red color filter 22R, and a deep-color portion 221G of a green color filter 22G.

6 Claims, 12 Drawing Sheets

FOREIGN PATENT DOCUMENTS

| | | |
|---|---|---|
| JP | 62-250416 | 10/1987 |
| JP | 11-052366 | 2/1999 |
| JP | 11-095022 | 4/1999 |
| JP | 2000-056294 | 2/2000 |
| JP | 2000-111894 | 4/2000 |
| JP | 2000-267081 | 9/2000 |
| JP | 2000-298271 | 10/2000 |
| JP | 2000-352710 | 12/2000 |
| JP | 2001-33778 | 2/2001 |
| JP | 2001-125094 | 5/2001 |
| JP | 2001-133777 | 5/2001 |
| JP | 2001-154181 | 6/2001 |
| JP | 2001-166289 | 6/2001 |
| JP | 2001-228318 | 8/2001 |
| JP | 2001-264720 | 9/2001 |
| JP | 2001-281648 | 10/2001 |
| JP | 2001-281653 | 10/2001 |
| JP | 2003-172922 | 6/2003 |
| WO | WO99-53368 | 10/1999 |

COLOR FILTER SUBSTRATE, METHOD FOR MANUFACTURING THE SAME, LIQUID CRYSTAL DISPLAY PANEL, AND ELECTRONIC EQUIPMENT

CROSS REFERENCE TO RELATED APPLICATION

This application is a continuation application of U.S. Ser. No. 11/188,934 filed Jul. 25, 2005, which is a divisional application of U.S. Ser. No. 10/310,636 filed Dec. 5, 2002 (now U.S. Pat. No. 6,954,241 issued Oct. 11, 2005), claiming priority to Japanese Patent Application No. 2001-374040 filed Dec. 7, 2001, all incorporated herein by reference.

DETAILED DESCRIPTION OF THE INVENTION

1. Technical Field of the Invention

The present invention relates to a color filter substrate and a method for manufacturing the same, and a liquid crystal display panel and electronic equipment using the color filter substrate.

2. Description of the Related Art

Conventionally, so-called semitransparent reflective liquid crystal display panels, in which the reflective display and the transmissive display can be changed on an as needed basis, have been suggested. As shown in FIG. 12, in this sort of liquid crystal display panel, a reflection layer 21 including a translucent portion 211 (opening) is arranged on a second substrate 20 facing a first substrate 10 so as to hold a liquid crystal 40 therebetween. On the observation side when viewed from the reflection layer 21, color filters 22, each being colored, for example, any one of red, green, and blue, are arranged. In FIG. 12, electrodes for applying a voltage to the liquid crystal 40, an orientation film for regulating the orientation condition of the liquid crystal 40, etc., are omitted from the drawing.

Under this configuration, incident light (external light, for example, room illumination light and sunlight) from the first substrate 10 side passes through the first substrate 10, the liquid crystal 40, and the color filter 22, and reaches the surface of the reflection layer 21 as indicated by a route R1 shown in FIG. 12. Subsequently, the light reflected at this surface passes through the color filter 22, liquid crystal 40, and the first substrate 10, outgoes on the observation side and, therefore, the reflective display is performed. On the other hand, incident light (for example, irradiation light by a backlight unit) from the second substrate 20 side passes through the second substrate 20 and the translucent portion 211 of the reflection layer 21 as indicated by a route R2 shown in FIG. 12. Thereafter, this light passes through the color filter 22, liquid crystal 40, and the first substrate 10, outgoes on the observation side and, therefore, the transmissive display is performed.

However, regarding the conventional semitransparent reflective liquid crystal display panel, the light visually identified by an observer in the reflective display is the light which has passed through the color filter 22 twice, there and back, while the light visually identified by the observer in the transmissive display is the light which has passed through the color filter 22 only once. Consequently, there has been a problem in that the chroma in the transmissive display has become lower than the chroma in the reflective display. On the other hand, generally, in the reflective display, since the brightness of display is likely to become inadequate, it is desirable to increase the light transmittance of the color filter 22 so as to ensure the brightness of the display. However, in such a case, the shortage of chroma in the transmissive display becomes more remarkable.

The present invention was made in consideration of the aforementioned circumstances. Accordingly, the object of the present invention is to provide a liquid crystal display panel capable of ensuring both of the brightness in the reflective display and the chroma in the transmissive display, a color filter substrate used for this liquid crystal display panel and a method for manufacturing the same, and electronic equipment using the liquid crystal display panel.

SUMMARY OF THE INVENTION

In order to overcome the aforementioned problems, a color filter substrate according to the present invention is provided with a substrate for holding a liquid crystal between the substrate and other substrate, a reflection layer for reflecting light which is arranged on the aforementioned substrate and which is provided with a translucent portion for transmitting light, a plurality of color filters which are arranged on the aforementioned substrate, which are for transmitting respective light with wavelengths corresponding to different colors, and each of which includes a deep-color portion being superimposed on at least the translucent portion of the aforementioned reflection layer and a light-color portion having an optical density lower than that of the deep-color portion, and a light-shielding layer composed of a laminate of at least the deep-color portions of the aforementioned plurality of color filters.

According to this color filter substrate, since the light, which reaches the surface of the reflection layer and which is reflected at the surface, passes through the light-color portion having a low optical density, the brightness of the reflected light can be maintained at a high level. On the other hand, since the light, which has passed through the translucent portion of the reflection layer, passes through the deep-color portion having a high optical density, the chroma of the transmitted light can be maintained at a high level. Furthermore, since the light-shielding layer is composed of a laminate of the deep-color portions having a high optical density in the color filters, an excellent light-shielding property can be achieved.

Although the aforementioned color filter substrate is provided with a reflection layer and is located on the backface side in the liquid crystal display panel, the color filter substrate according to the present invention can also be used as the one located on the observation side. That is, the color filter substrate may be provided with a substrate for holding a liquid crystal between the substrate and other substrate provided with a reflection layer for reflecting light, the reflection layer being provided with a translucent portion for transmitting light, a plurality of color filters which are arranged on the aforementioned substrate, which are for transmitting respective light with wavelengths corresponding to different colors, and each of which includes a deep-color portion being superimposed on at least the translucent portion of the aforementioned reflection layer and a light-color portion having an optical density lower than that of the deep-color portion, and a light-shielding layer composed of a laminate of at least the deep-color portions of the aforementioned plurality of color filters. In this case as well, the chroma of the transmitted light can be maintained at a high level without loss of the brightness of the reflected light and, in addition, the light-shielding property of the light-shielding layer can be improved.

In the color filter substrate according to the present invention, the aforementioned light-shielding layer may be composed of a laminate of the deep-color portions of the aforementioned plurality of color filters and the light-color portion of at least one color filter of the aforementioned plurality of color filters. According to this, the light-shielding property can be further improved compared with that in the case where the light-shielding layer is composed of only the deep-color portions of the color filters.

In order to overcome the aforementioned problems, in the present invention, a liquid crystal display panel including a liquid crystal between a first substrate and a second substrate facing each other is provided with a reflection layer for reflecting the light incident from an observation side, the reflection layer being arranged on the second substrate and being provided with a translucent portion for transmitting light incident from the backface side upon the observation side, a plurality of color filters which are arranged on the observation side with respect to the aforementioned reflection layer, which are for transmitting respective light with wavelengths corresponding to different colors, and each of which includes a deep-color portion being superimposed on at least the translucent portion of the aforementioned reflection layer and a light-color portion having an optical density lower than that of the deep-color portion, and a light-shielding layer composed of a laminate of at least the deep-color portions of the aforementioned plurality of color filters.

According to this liquid crystal display panel, for the same reasons as those described above with respect to the color filter substrate, the chroma in the transmissive display can be maintained at a high level without loss of the brightness in the reflective display. In addition, since the light-shielding property of the light-shielding layer can be improved, excellent contrast of the display can be realized. Here, "optical density" refers to the ability to make the wavelength distribution of light one-sided on a unit thickness of the color filter basis. That is, when the optical density is high (large), the chroma of the transmitted light becomes strong, and when the optical density is low (small), the chroma of the transmitted light becomes weak.

In this liquid crystal display panel, the aforementioned plurality of color filters and the aforementioned light-shielding layer may be arranged on the aforementioned second substrate. Furthermore, it is also desirable that the aforementioned light-shielding layer has a configuration composed of a laminate of the deep-color portions of the aforementioned plurality of color filters and the light-color portion of at least one color filter of the aforementioned plurality of color filters. In this case, since the optical density of the light-shielding layer can be improved compared with that in the case where the light-shielding layer is composed of only deep-color portions of the color filters, further excellent contrast of the display can be achieved.

It has been discovered that in the case where each of the aforementioned plurality of color filters transmitted light with a wavelength corresponding to any one of red, green, and blue, in a CIE chromaticity diagram, the area of color reproduction region when transmissive display was performed while light incident from the backface side was allowed to pass through the translucent portion of the aforementioned reflection layer was specified to be 3.5 times or more, but 5 times or less than the area of color reproduction region when reflective display was performed while light incident from the observation side was reflected by the aforementioned reflection layer and, therefore, especially excellent display quality could be achieved. Consequently, it is desirable that the optical densities of the aforementioned deep-color portion and the light-color portion are chosen in order to satisfy this condition.

In order to overcome the aforementioned problems, electronic equipment according to the present invention is provided with the aforementioned liquid crystal display panel. As described above, since the chroma in the transmissive display can be maintained at a high level without loss of the brightness in the reflective display and, in addition, excellent contrast of the display can be achieved by the liquid crystal display panel according to the present invention, the liquid crystal display panel is especially suitable for electronic equipment required for high display quality. Possible examples of such electronic equipment include, for example, personal computers and cellular phones.

In order to overcome the aforementioned problems, in the present invention, a method for manufacturing a color filter substrate including a plurality of color filters for transmitting respective light with wavelengths corresponding to different colors, includes the steps of forming a reflection layer for reflecting light, which is provided with a translucent portion for transmitting light, on a substrate for holding a liquid crystal between the substrate and other substrate, and forming a deep-color portion being superimposed on at least the translucent portion of the aforementioned reflection layer and a light-color portion having an optical density lower than that of the deep-color portion on the aforementioned substrate and, thereby, forming the aforementioned plurality of color filters, each including the aforementioned deep-color portion and light-color portion, and a light-shielding layer composed of a laminate of at least the deep-color portions of the plurality of color filters on the aforementioned substrate.

According to the color filter substrate produced by this method for manufacture, the chroma of the transmitted light can be maintained at a high level without loss of the brightness of the reflected light by the reflection layer and, furthermore, the light-shielding property of the light-shielding layer can be improved. In addition, since the light-shielding layer can be produced at the same time with formation of the color filters, simplification of the manufacturing steps can be achieved compared with that in the case where the light-shielding layer and the color filters are formed in separate steps.

The present invention can also be used in the case where the color filters are arranged on a substrate different from the substrate provided with the reflection layer. That is, a method for manufacturing a color filter substrate including a plurality of color filters for transmitting respective light with wavelengths corresponding to different colors may include the step of forming a deep-color portion to be superimposed on at least a translucent portion of a reflection layer and a light-color portion having an optical density lower than that of the deep-color portion on the substrate for holding a liquid crystal between the substrate and other substrate including the aforementioned reflection layer for reflecting light, the reflection layer being provided with a translucent portion for transmitting light, and thereby, forming the aforementioned plurality of color filters, each including the aforementioned deep-color portion and light-color portion, and a light-shielding layer composed of a laminate of at least the deep-color portions of the plurality of color filters. In this case, effects similar to those in the aforementioned method for manufacture can be achieved as well.

In these methods for manufacture, when the aforementioned deep-color portion and light-color portion are formed, it is desirable to form the light-shielding layer composed of a laminate of the deep-color portions of the aforementioned plurality of color filters and the light-color portion of at least one color filter of the aforementioned plurality of color filters. According to this, the light-shielding property can be further improved compared with that of the light-shielding layer composed of only deep-color portions of the color filters.

DESCRIPTION OF THE PREFERRED EMBODIMENTS

Figure 1:
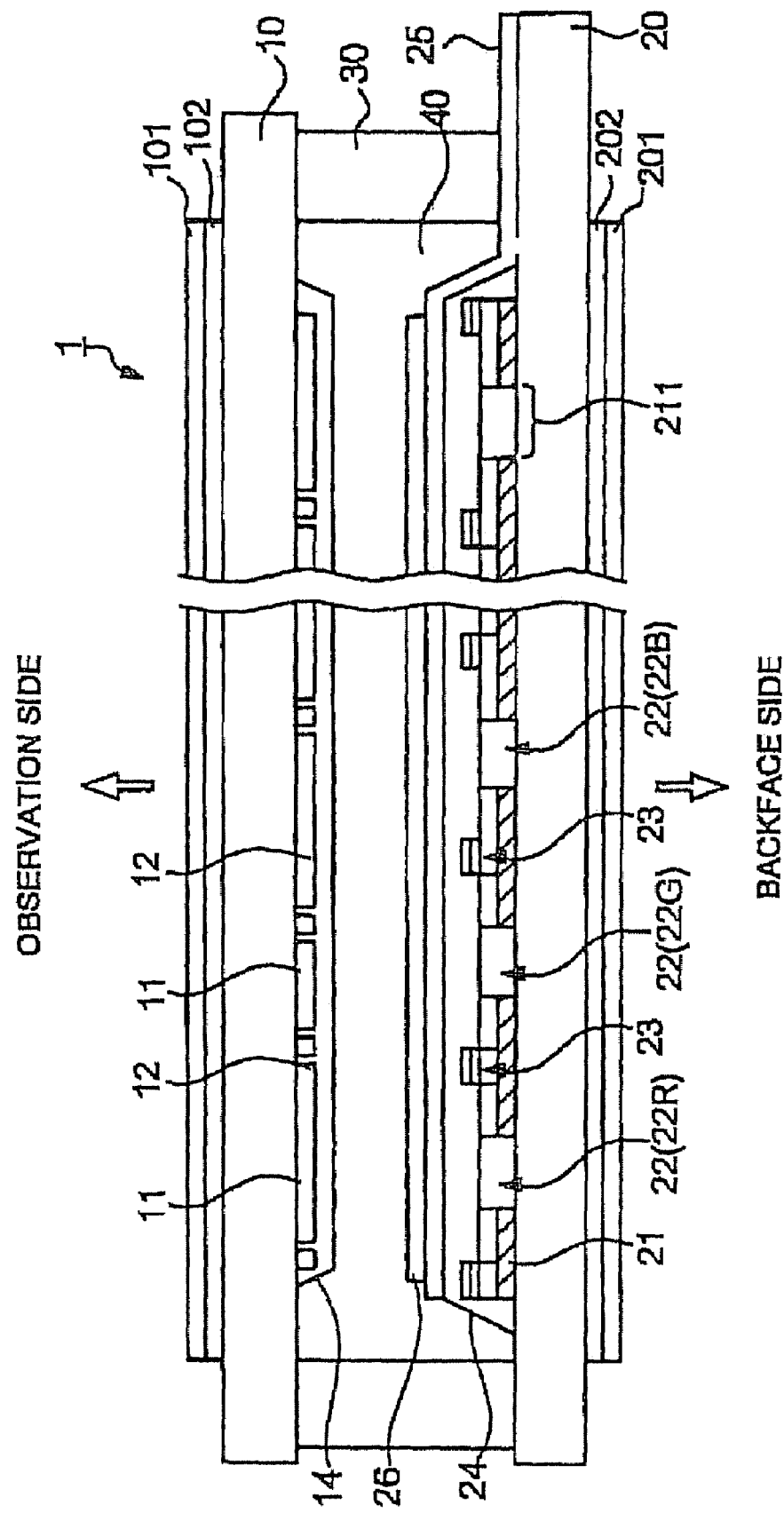
FIG. 1 is a sectional view showing the configuration of a liquid crystal display panel according to the first embodiment.

The embodiments of the present invention will be described below with reference to the drawings. The specification describes one or more embodiments of the present invention. However, the specific examples disclosed herein is not intended to limit the present invention and, therefore, certain modifications can be performed within the scope of the present invention. Regarding each drawing described below, the scale is varied on a layer or member basis in order that each layer or each member has a size capable of being identified in the drawing.

A. First Embodiment

The first embodiment will be described, in which the present invention is applied to a semitransparent reflective liquid crystal display panel of an active matrix system. In the case exemplified below, a TFD (Thin Film Diode) element, which is a two-terminal switching element, is used as a switching element.

A-1: Configuration of Liquid Crystal Display Panel

FIG. 1 is a sectional view showing the configuration of a liquid crystal display panel according to the present embodiment. As shown in FIG. 1, this liquid crystal display panel 1 has a configuration in which a first substrate 10 and a second substrate 20 facing each other are adhered with a sealing member 30 therebetween and, in addition, a liquid crystal 40 of, for example, TN (Twisted Nematic) type and STN (Super Twisted Nematic) type, is encapsulated in the region surrounded by both of the substrates and the sealing member 30. Hereafter, the first substrate 10 side, when viewed from the liquid crystal 40, is denoted as "observation side". This refers to the side of an observer visually identifying the display by the liquid crystal display panel 1. On the other hand, the second substrate 20 side, when viewed from the liquid crystal 40, is denoted as "backface side".

The first substrate 10 and the second substrate 20 are plate-shaped members, for example, glass, quartz, and plastic, having a light transmission property. Polarizing plates 101 and 201 for polarizing incident light and phase difference plates 102 and 202 for compensating interference colors are adhered to the outer sides (the side opposite to the liquid crystal 40) of the first substrate 10 and the second substrate 20, respectively. A backlight unit (illumination apparatus) is arranged on the backface side of the liquid crystal display panel 1 in practice, although not shown in the drawing.

Figure 2:
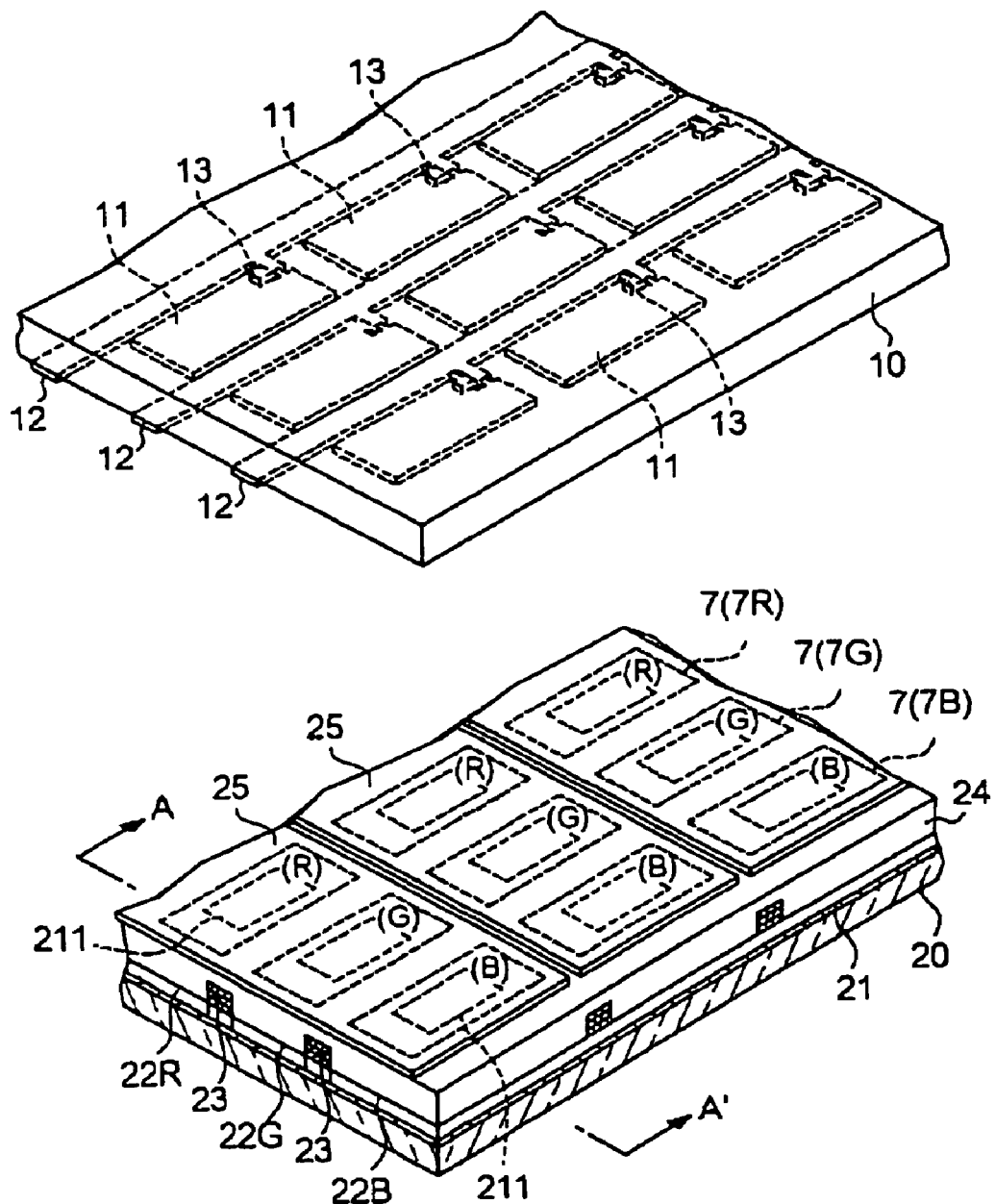
FIG. 2 is a perspective view showing the configuration of a key portion of the liquid crystal display panel shown in FIG. 1.

FIG. 2 is a perspective view showing a key portion of the liquid crystal display panel 1 under magnification. FIG. 1 corresponds a sectional view of the section indicated by a line A-A' shown in FIG. 2. In FIG. 2, in order to prevent complication of the drawing, illustrations of the polarizing plates 101 and 201 and the phase difference plates 102 and 202 shown in FIG. 1 are omitted appropriately. As shown in FIG. 1 and FIG. 2, a plurality of pixel electrodes 11 arranged in the shape of a matrix and a plurality of scanning lines 12 extending in one direction in gap portions between individual pixel electrodes 11 are arranged on the inner (liquid crystal 40 side) surface of the first substrate 10. Each pixel electrode 11 is a nearly rectangular electrode formed from a transparent conductive material, for example, ITO (Indium Tin Oxide).

As shown in FIG. 2, each pixel electrode 11 and the scanning line 12 adjacent to the pixel electrode 11 are connected with a TFD element 13 therebetween. Each TFD element 13 is a two-terminal switching element having a non-linear current-voltage characteristic. As shown in FIG. 1, the surface of the first substrate 10 provided with the pixel electrodes 11, scanning lines 12, and TFD elements 13 is covered with an orientation film 14 (not shown in FIG. 2). This orientation film 14 is an organic thin film made of polyimide, etc., and has been subjected to a rubbing treatment for regulating the orientation condition of the liquid crystal 40 when no voltage is applied.

On the other hand, a reflection layer 21, color filters 22 (22R, 22G, and 22B), a light-shielding layer 23, an overcoat layer 24, data lines 25, and an orientation film 26 are arranged on the inner (liquid crystal 40 side) surface of the second substrate 20 in that order when viewed from the second substrate 20 side. Among them, the overcoat layer 24 is a layer for flattening height differences formed by the color filters 22 and the light-shielding layer 23, and is formed from, for example, an epoxy-based and an acryl-based resin material. As shown in FIG. 2, a plurality of data lines 25 are arranged on the surface of this overcoat layer 24.

Each data line 25 is a belt-shaped electrode formed from a transparent conductive material, for example, ITO. Furthermore, each data line 25 is extended in the direction intersecting the aforementioned scanning line 12, and is facing a plurality of pixel electrodes 11 arranged in a row on the first substrate 10.

Under such a configuration, regarding the liquid crystal 40 held between the first substrate 10 and the second substrate 20, the orientation direction thereof varies by application of a voltage between a pixel electrode 11 and the data line 25 facing each other. That is, as shown in FIG. 2, regions in which individual pixel electrodes 11 and individual data lines 25 are facing each other are arranged in the shape of a matrix, and each of them functions as a subpixel 7. In other words, it can be said that the subpixel 7 is a minimum unit of the region in which the orientation direction of the liquid crystal 40 varies in accordance with application of a voltage.

The reflection layer 21 is formed from a single metal, for example, aluminum and silver, an alloy primarily containing these metals, or the like, and is a thin film having a light reflection property. Incident light (for example, room illumination light and sunlight) from the observation side upon the liquid crystal display panel 1 is reflected at the surface of the reflection layer 21. This reflected light outgoes on the observation side and is visually identified by the observer, so that the reflective display is performed. The inner surface of the second substrate 20 has been roughened (not shown in the drawing), and a scattering structure has been formed on the surface of the reflection layer 21 incorporating this roughened surface.

In addition, as shown in FIG. 1 and FIG. 2, a translucent portion 211 is arranged in the neighborhood of the center portion of each subpixel 7 in the reflection layer 21. The translucent portion 211 is an opening for allowing the light incident from the backface side to pass through upon the observation side with respect to the liquid crystal display panel 1. That is, the irradiation light by the backlight unit outgoes on the observation side through the translucent portion 211 of the reflection layer 21. This light is visually identified by the observer and, therefore, the transmissive display is realized.

The color filter 22 is a resin layer formed corresponding to each subpixel 7, and is colored any one of red (R), green (G), and blue (B) with a dye or pigment. That is, each of the color filters 22 (22R, 22Q and 22B) of respective colors selectively transmits light with a wavelength corresponding to the color thereof. The exemplified case in the present embodiment adopts a configuration (so-called stripe arrangement) in which, as shown in FIG. 2, color filters 22 of the same color are arranged across a plurality of subpixels 7 aligned in a row in the extension direction of the scanning lines 12.

Figure 3:
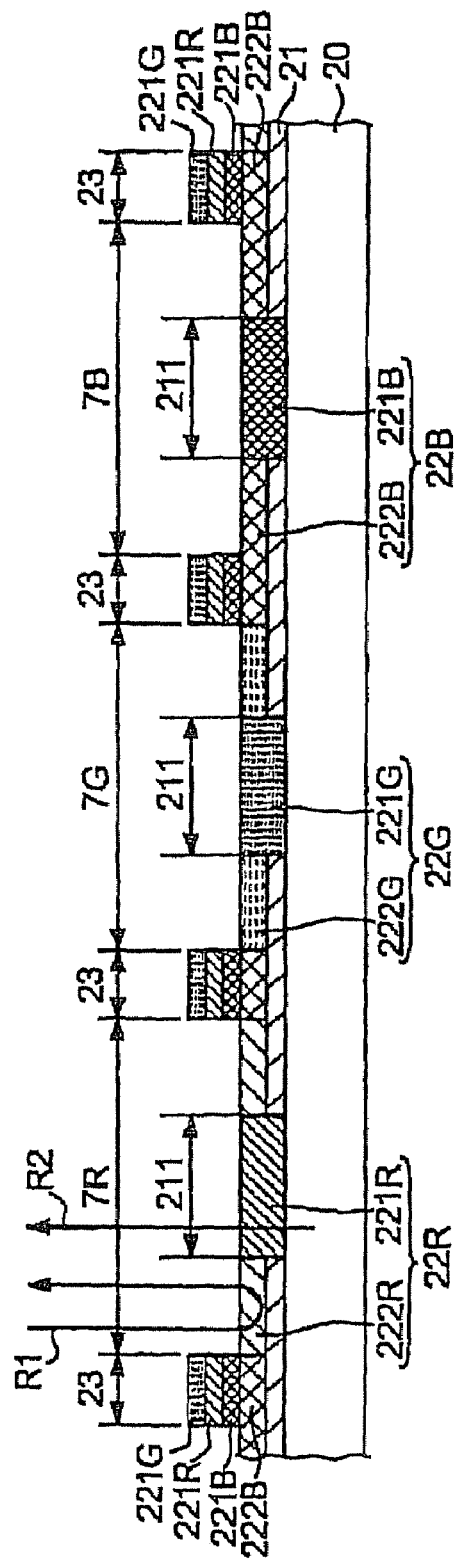
FIG. 3 is a sectional view showing a reflection layer, color filters, and a light-shielding layer under magnification.

FIG. 3 is a sectional view showing the reflection layer 21, the color filters 22, and the light-shielding layer 23 on the second substrate 20 under magnification. As shown in FIG. 3, each of color filters 22 of respective colors is composed of a deep-color portion 221 and a light-color portion 222. That is, a red color filter 22R is composed of a deep-color portion 221R and a light-color portion 222R, a green color filter 22G is composed of a deep-color portion 221G and a light-color portion 222G, and a blue color filter 22B is composed of a deep-color portion 221B and a light-color portion 222B. In each of the color filters 22 of respective colors, the deep-color portion 221 is arranged while being superimposed on the translucent portion 211 of the reflection layer 21 in the subpixel 7. On the other hand, the light-color portion 222 is arranged while being superimposed on the portion other than the translucent portion 211 of the reflection layer 21 in the subpixel 7. When attention is focused on one color filter 22, the optical density of the deep-color portion 221 of the color filter 22 is higher than the optical density of the light-color portion 222. The optical density refers to the ability to concentrate the wavelength distribution of light per unit thickness of the color filter. That is, when the optical density is high (large), the chroma of the transmitted light becomes strong, and when the optical density is low (small), the chroma of the transmitted light becomes weak. The optical density of the color filter 22 is determined in accordance with, for example, a concentration of a colorant (pigment or dye) blended into a transparent resin. That is, in the present embodiment, the colorant has been blended into the resin material constituting the deep-color portion 221 in one color filter 22 at a concentration higher than that in the resin material constituting the light-color portion 222.

When the reflective display is performed in the liquid crystal display panel 1 according to the present invention, as indicated by a route R1 shown in FIG. 3, incident light from the first substrate 10 side passes through the light-color portion 222 of the color filter 22, and reaches the surface of the reflection layer 21. Subsequently, the light reflected at the surface passes again through the light-color portion 222, and outgoes on the observation side. Since the optical density of the light-color portion 222 is lower than that of the deep-color portion 211, the brightness of the display when the reflective display is performed can be maintained. On the other hand, when the transmissive display is performed, as indicated by a route R2 shown in FIG. 3, incident light (irradiation light by a backlight unit) from the second substrate 20 side passes through the deep-color portion 221 of the color filter 22 from the translucent portion 211 of the reflection layer 21, and outgoes on the observation side. Since the optical density of the deep-color portion 221 is higher than that of the light-color portion 222, the chroma when the transmissive display is performed can be maintained at a high level. As described above, according to the present embodiment, the chroma in the transmissive display can be improved without loss of the brightness in the reflective display.

The light-shielding layer 23 is formed in the shape of a lattice while being superimposed on the gap portions between individual subpixels 7 arranged in the shape of a matrix, and performs a function of shielding the gaps between individual subpixels 7 from light. This light-shielding layer 23 has a configuration of a laminate of the deep-color portions 221 of three color filters 22 of red, green, and blue as shown in FIG. 3. Furthermore, in the present embodiment, the light-color portion 222B of the blue color filter 22B is contained in the laminate in addition to these deep-color portions 221. That is, the light-shielding layer 23 has a configuration composed of a laminate of the light-color portion 222B of the blue color filter 22B, the deep-color portion 221B of the blue color filter 22B, the deep-color portion 221R of the red color filter 22R, and the deep-color portion 221G of the green color filter 22G in that order when viewed from the surface of the second substrate 20.

Figure 12:
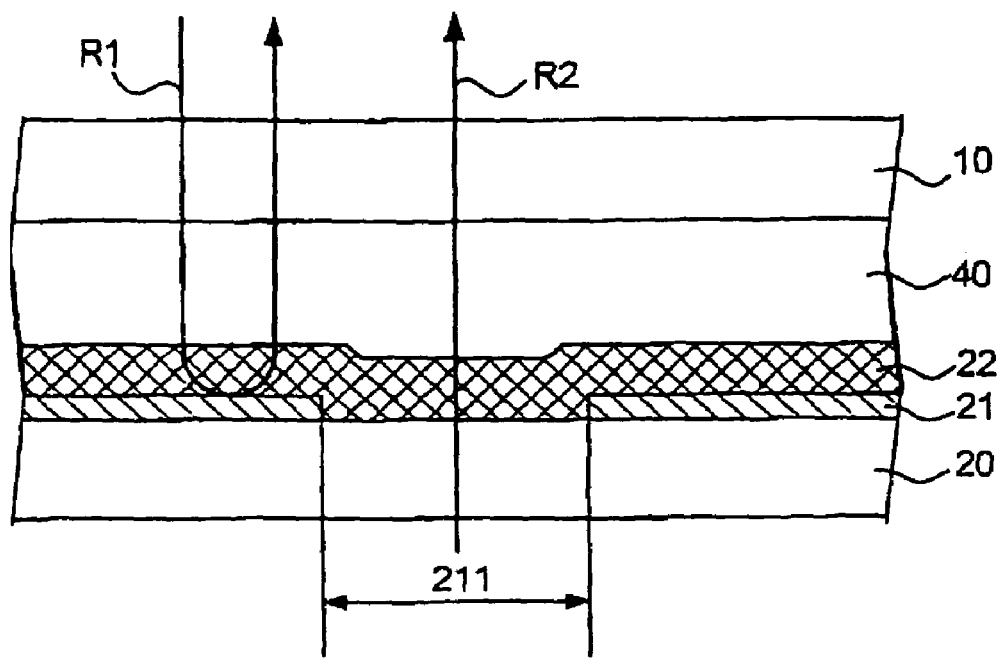
FIG. 12 is a sectional view showing the configuration of a conventional liquid crystal display panel.

Regarding the conventional configuration in which a single (that is, the deep-color portion 221 and the light-color portion 222 are not divided) color filter 22 is arranged with respect to each subpixel 7 as shown in FIG. 12, a color filter 22 having a relatively low optical density must be used in order to ensure the brightness in the reflective display. Also, if the light-shielding layer 23 of a laminate of such color filters 22 has a low optical density, light-shielding between individual subpixels 7 becomes inadequate and, therefore, adequate contrast of display may not be achieved. On the other hand, since the light-shielding layer 23 in the present embodiment is composed of a laminate of the deep-color portions 221 having a high optical density of the color filters 22 of respective colors, the optical density of the total light-shielding layer 23 can be increased by a large degree. Consequently, according to the present embodiment, light-shielding between individual subpixels 7 becomes adequate and, therefore, excellent contrast of the display is realized compared with that in the conventional configuration shown in FIG. 12.

Although room illumination light, sunlight, etc., are used in the reflective display, illumination light by a backlight unit is used in the transmissive display. Consequently, in general, the quantity of light used for displaying in the reflective display tends to be reduced remarkably compared with the quantity of light used for displaying in the transmissive display. Even under such circumstances, the optical densities of the deep-color portion 221 and the light-color portion 222 of each color filter 22 is desirably chosen in order that excellent display quality can be maintained in both of the reflective display and the transmissive display. Detailed description will be made below.

Figure 4:
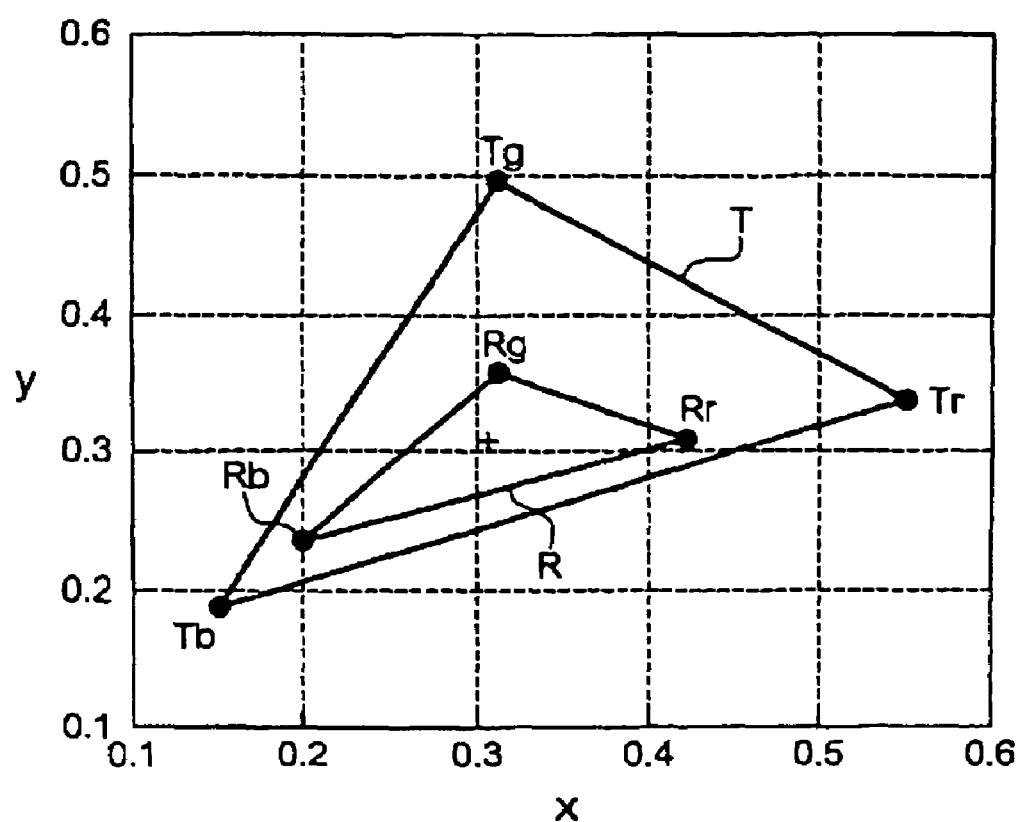
FIG. 4 is a CIE chromaticity diagram showing the areas of color reproduction region in the reflective display and the transmissive display.

FIG. 4 is a CIE chromaticity diagram showing the area of color reproduction region in the reflective display and the area of color reproduction region in the transmissive display. When each color of the red, green, and blue is assumed to be displayed by the reflective display or the transmissive display, three points corresponding to practically displayed each color can be plotted on the CIE chromaticity diagram. The region of the triangle having apexes of these three points is the color reproduction region. For example, as shown in FIG. 4, the area of color reproduction region R of the reflective display becomes a triangular region having three apexes of a point Rr corresponding to red display, a point Rg corresponding to green display, and a point Rb corresponding to blue display. Similarly, the area of color reproduction region T of the transmissive display becomes a triangular region having three apexes of a point Tr corresponding to red display, a point Tg corresponding to green display, and a point Tb corresponding to blue display.

It was discovered that when the area of color reproduction region T of the transmissive display was at least about 3.5 greater but less than about 5 times the area of color reproduction region R of the reflective display, excellent display quality could be maintained in both of the reflective display and the transmissive display. Consequently, it can be said desirable that the optical densities of the deep-color portion 221 and the light-color portion 222 of each color are chosen in order to set the area ratio of the color reproduction region R to the color reproduction region T at (color reproduction region R:color reproduction region T)=(1:3.5 to 5) when the reflective display and the transmissive display are performed in the liquid crystal display panel 1.

A-2: Manufacturing Process of Liquid Crystal Display Panel

Figure 5:
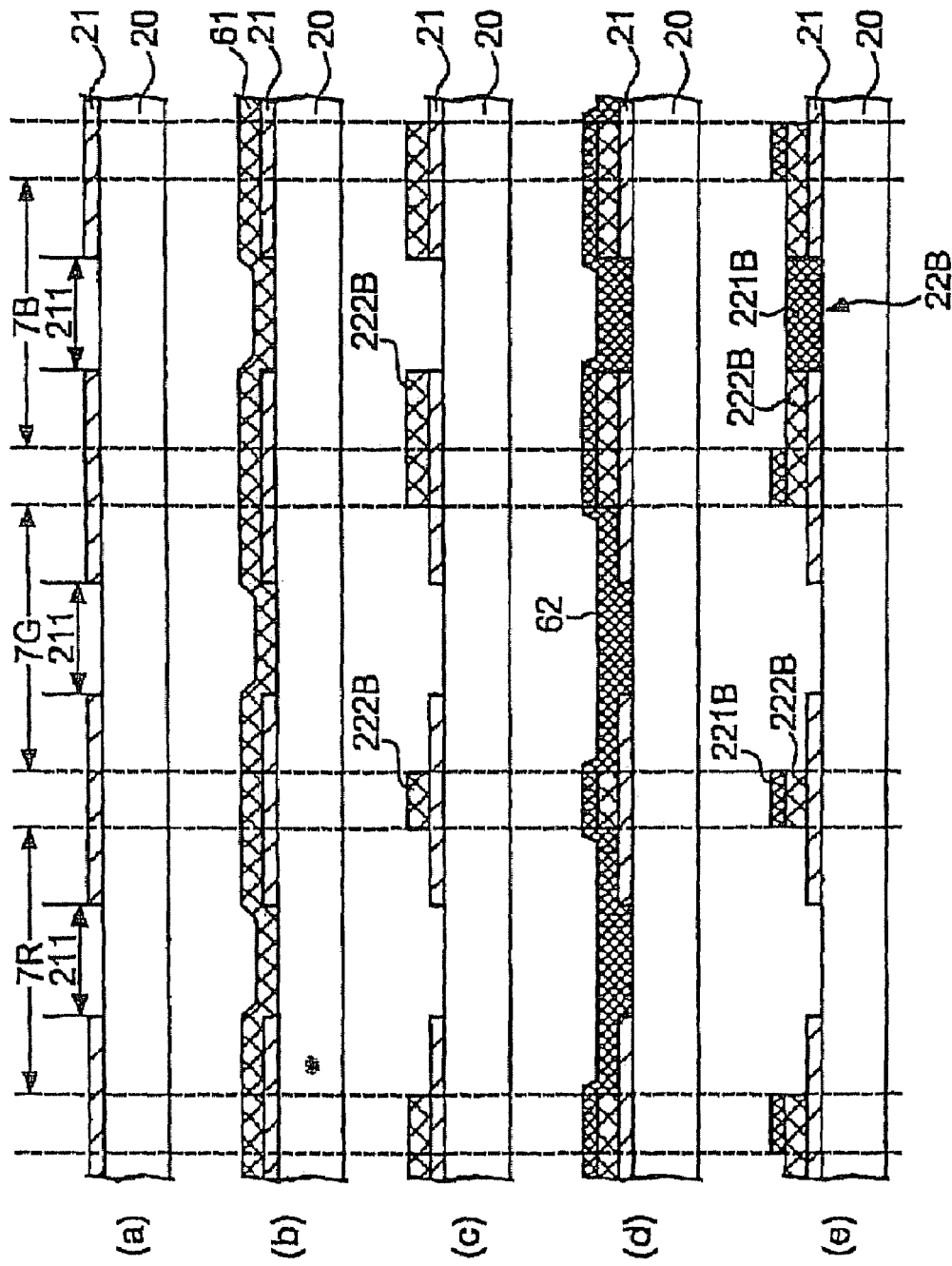
FIG. 5 is a sectional view showing a manufacturing process of the liquid crystal display panel shown in FIG. 1.
Figure 6:
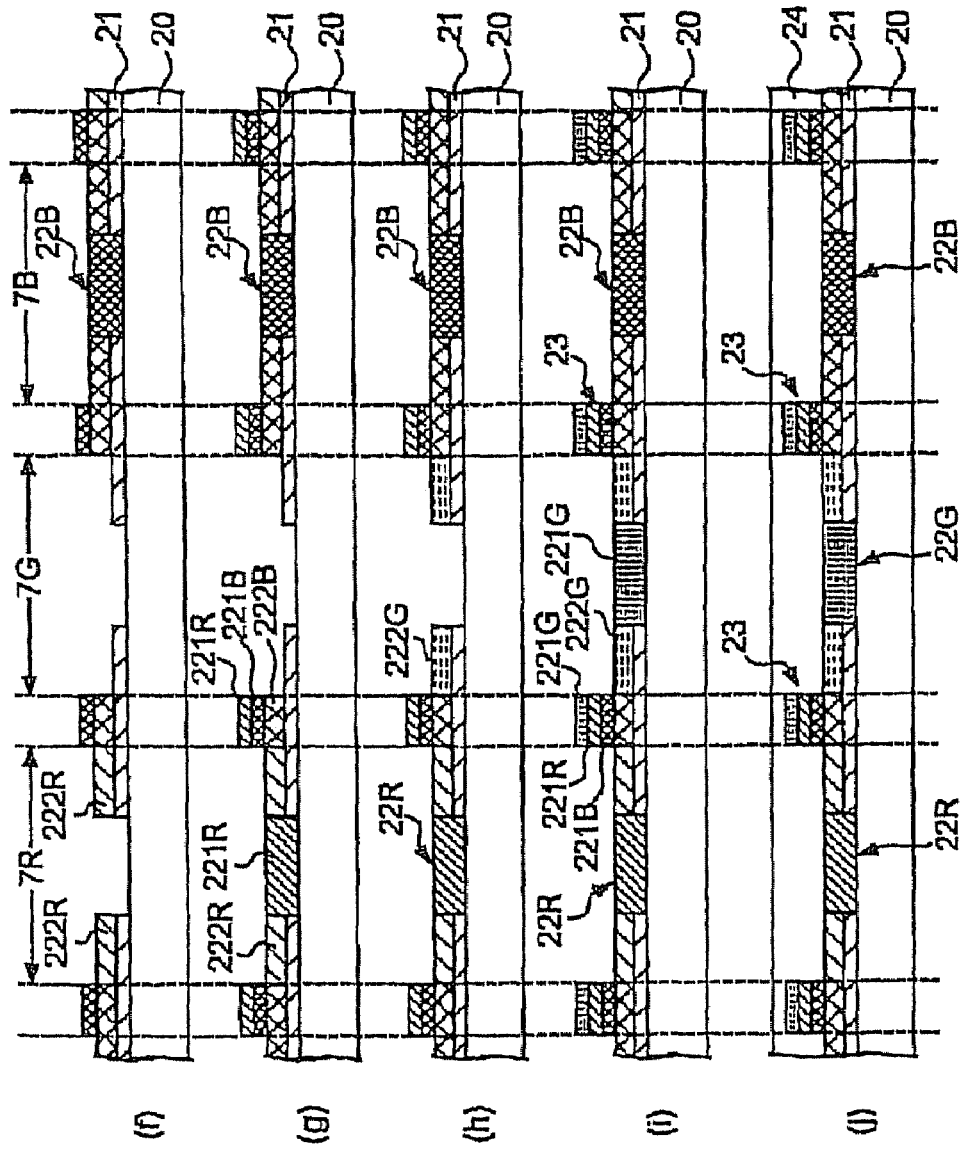
FIG. 6 is a sectional view showing a manufacturing process of the liquid crystal display panel shown in FIG. 1.

A manufacturing process of the liquid crystal display panel 1 according to the present embodiment will be described with reference to FIG. 5 and FIG. 6. However, since each constituent on the first substrate 10 can be manufactured using various known techniques, explanations thereof are omitted and, therefore, manufacturing processes of the reflection layer 21, color filters 22, and light-shielding layer 23 on the second substrate 20 will be primarily explained below.

A thin film of a metal having a light reflection property is formed by a sputtering method, etc., in order to cover all over the second substrate 20 surface which is to face the first substrate 10. Subsequently, the resulting thin film is patterned using photolithography and etching technology and, therefore, as shown in FIG. 5(a), the reflection layer 21 provided with translucent portions 211 (sometimes referred to herein as "openings" or "light-transmitting portions") in accordance with individual subpixels 7 is formed. In order to form a scattering structure on the surface of the reflection layer 21, desirably, the surface of the second substrate 20 is roughened in advance of formation of the reflection layer 21. Alternatively, a resin layer covering the surface of the second substrate 20 may be formed in advance of formation of the reflection layer 21 and, thereafter, the surface of this resin layer may be roughened.

Subsequently, color filters 22 of respective colors are formed sequentially on the surface of the second substrate 20 provided with the reflection layer 21. At this time, the blue color filter 22B, the red color filter 22R, and the green color filter 22G are assumed to be formed in that order. Regarding formation of the color filters 22 of respective colors, it is assumed that the light-color portion 222 is formed firstly, and then, the deep-color portion 221 is formed.

As shown in FIG. 5(b), a resin layer 61 colored blue is formed on all over the surface of the second substrate 20. This resin layer 61 becomes the light-color portion 222B of the blue color filter 22B. Subsequently, the resulting resin layer 61 is partially removed using photolithography and etching technology. Specifically, as shown in FIG. 5(c), the resin layer 61 is removed except the portion not being superimposed on the translucent portion 211 of the blue subpixel 7B (that is, the portion corresponding to the light-color portion 222B of the blue color filter 22B) and the gap portions between individual subpixels 7 (that is, the lattice-shaped portion to be provided with the light-shielding layer 23).

As shown in FIG. 5(d), a resin layer 62 colored blue is formed on all over the surface of the second substrate 20. This resin layer 62 becomes the deep-color portion 221B of the blue color filter 22B. Consequently, the resin layer 62 contains a blue colorant at a concentration higher than that in the resin layer 61 shown in FIG. 5(b).

Subsequently, the resin layer 62 is partially removed in a manner similar to that in the step shown in FIG. 5(c). That is, as shown in FIG. 5(e), the resin layer 62 is removed except the portion being superimposed on the translucent portion 211 of the blue subpixel 7B (that is, the portion corresponding to the deep-color portion 221B of the blue color filter 22B) and the gap portions between individual subpixels 7 (that is, the portion to be provided with the light-shielding layer 23). According to the aforementioned steps, the blue color filter 22B composed of the deep-color portion 221B being superimposed on the translucent portion 211 of the reflection layer 21 and the light-color portion 222B having an optical density lower than the deep-color portion 221B is formed and, in addition, a part of the light-shielding layer 23 which is a laminate of the deep-color portion 221B and the light-color portion 222B is formed.

Then, a series of steps shown in FIG. 5(b) to FIG. 5(e) are repeated with respect to red and green as well. That is, a resin layer colored red is formed on the surface of the second substrate 20. Subsequently, this resin is partially removed and, therefore, as shown in FIG. 6(f), the light-color portion 222R of the red color filter 22R is formed. Although the portion corresponding to the light-shielding layer 23 was not removed regarding the resin layer 61 for forming the blue light-color portion 222B, regarding the resin layer for forming red and green, which is described later, light-color portions 222, the portions corresponding to this light-shielding layer 23 are removed.

After a resin layer containing a colorant at a concentration higher than that in the light-color portion 222R is formed on the second substrate 20, this resin layer is partially removed and, therefore, as shown in FIG. 6(g), the deep-color portion 221R of the red color filter 22R and the deep-color portion 221R constituting the light-shielding layer 23 are formed. According to the steps shown in FIGS. 6(f) and (g), the red color filter 22R composed of the deep-color portion 221R and the light-color portion 222R is formed.

Subsequently, in a procedure similar to that shown in FIGS. 5(b) and (c), as shown in FIG. 6(h), the light-color portion 222G of the green color filter 22G is formed and, in addition, in a procedure similar to that shown in FIGS. 5(d) and (e), as shown in FIG. 6(i), the deep-color portions 221G of the green color filter 22G are formed. This deep-color portion 221G is installed on the portion corresponding to the light-shielding layer 23. As a result, the green color filter 22G composed of the deep-color portion 221G and the light-color portion 222G is formed and, in addition, the light-shielding layer 23 which is composed of a laminate of the blue light-color portion 222B, the blue deep-color portion 221B, the red deep-color portion 221R, and the green deep-color portion 221G is formed.

Subsequently, as shown in FIG. 6(j), an epoxy-based or acryl-based resin material is applied by coating in order to cover all over the surface of the second substrate 20 provided with the reflection layer 21, color filters 22, and the light-shielding layer 23, firing is performed and, therefore, the overcoat layer 24 is formed. Furthermore, the data lines 25 made of ITO are formed on the surface of this overcoat layer 24 and, in addition, the orientation film 26 is formed in order to cover these data lines 25.

Up to this point, the manufacturing process of each constituent on the second substrate 20 has been described. Then, the second substrate 20 produced by this manufacturing process and the first substrate 10 provided with the pixel electrodes 11 and the scanning lines 12 are adhered with each other with the sealing member 30 in the condition that the surfaces provided with electrodes are faced each other. The liquid crystal 40 is encapsulated in the region surrounded by both of the substrates and the sealing member 30 and, therefore, the liquid crystal display panel 1 shown in FIG. 1 is produced.

According to the manufacturing method described above, the light-shielding layer 23 can be formed simultaneously in the step of forming the color filters 22. Consequently, simplification of the manufacturing steps and reduction in the manufacturing cost can be achieved compared with those in the case where the color filter 22 and the light-shielding layer 23 are formed in separate steps.

Second Embodiment

Figure 7:
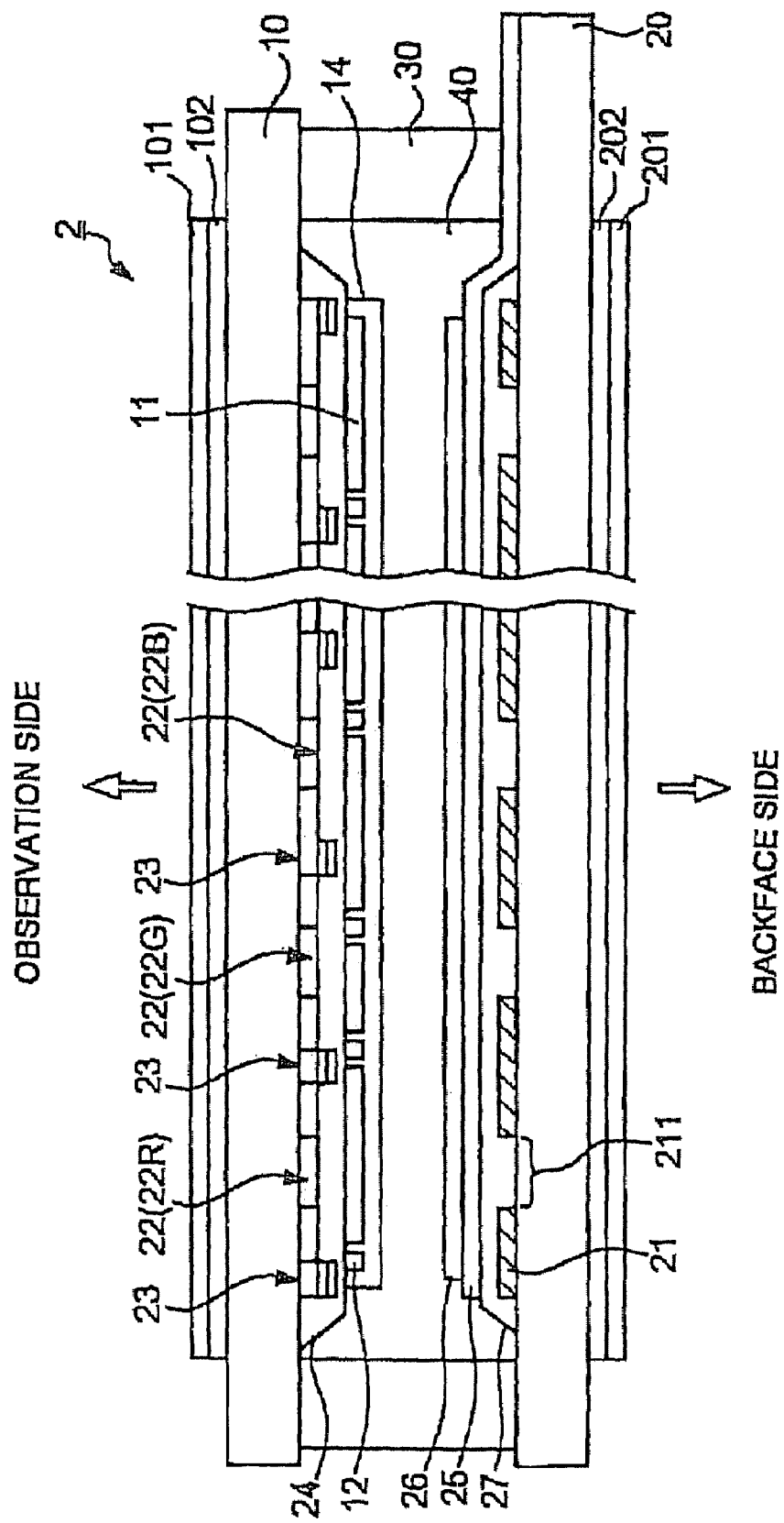
FIG. 7 is a sectional view showing the configuration of a liquid crystal display panel according to the second embodiment.

Next, the configuration of a liquid crystal display panel according to the second embodiment of the present invention will be described with reference to FIG. 7. Among the constituents shown in FIG. 7, common constituents with the liquid crystal display panel according to the first embodiment shown in the aforementioned FIG. 1 are indicated by the same reference numerals.

In the aforementioned embodiment, the configuration in which the color filters 22 and the light-shielding layer 23 are arranged on the surface of the second substrate 20 located on the backface side was exemplified. On the other hand, in a liquid crystal display panel 2 according to the present embodiment, as shown in FIG. 7, the color filters 22, the light-shielding layer 23, and the overcoat layer 24 are arranged on the surface of the first substrate 10 located on the observation side.

That is, the color filters 22 (22R, 22Q and 22B), each being colored any one of red, green, and blue, are arranged on the inner surface of the first substrate 10. The color filter 22 in the present embodiment has a configuration similar to that of the color filter 22 shown in the aforementioned first substrate, and is composed of the deep-color portion 221 being superimposed on the translucent portion 211 of the reflection layer 21 and the light-color portion 222 having an optical density lower than the deep-color portion 221. The light-shielding layer 23 has a configuration composed of a laminate of the deep-color portions 221 of at least each of red, green, and blue color filters 22. However, in the present embodiment, in a manner similar to that in the aforementioned first embodiment, the light-color portion 222B of the blue color filter 22B is also contained in the laminate in addition to the deep-color portions 221 of each of the colors. The overcoat layer 24 is arranged in order to cover the surface of the first substrate 10 provided with the color filters 22 and the light-shielding layer 23. The pixel electrodes 1, the scanning lines 12, and the TFD elements 13 are arranged on the surface of the overcoat layer 24, and the orientation film 14 is arranged in order to cover the overcoat layer 24. The color filters 22 and the light-shielding layer 23 of the liquid crystal display panel 2 according to the present embodiment are manufactured through a manufacturing process similar to that described in the first embodiment using FIG. 5 and FIG. 6 as examples.

On the other hand, the reflection layer 21 arranged on the inner surface of the second substrate 20 is covered with an insulation layer 27 made of a resin material, etc. The data lines 25 and the orientation film 26 are arranged on the surface of this insulation layer 27.

Effects similar to those in the aforementioned first embodiment can also be achieved by the aforementioned configuration in which the first substrate 10 located on the observation side is provided with the color filters 22 and the light-shielding layer 23 and, in addition, the second substrate 20 located on the backface side is provided with the reflection layer 21. That is, the color filter substrate according to the present invention refers to a substrate provided with the color filters 22 and the light-shielding layer 23 regardless of whether the substrate is arranged on the observation side or backface side.

Modified Example

The aforementioned embodiments are no more than an exemplification, and various modifications can be applied to the aforementioned embodiments within the purport of the present invention. It is considered that modified examples include, for example, the following.

C-1. Modified Example 1

Figure 8:
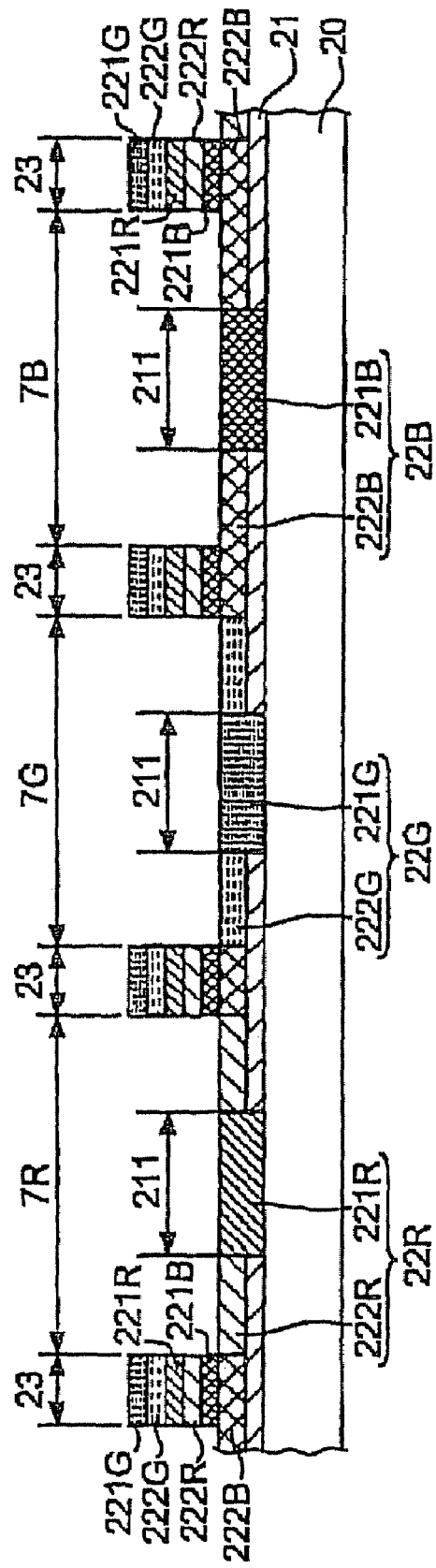
FIG. 8 is a sectional view showing a reflection layer, color filters, and a light-shielding layer of a liquid crystal display panel according to a modified example of the present invention under magnification.

In the aforementioned embodiment, the light-shielding layer 23 was configured as a laminate of the deep-color portions 221 of each of red, green, and blue color filters 22 and the light-color portion 222B of the blue color filter 22B. However, the lamination structure of the light-shielding layer 23 is not limited to this. For example, as shown in FIG. 8, the light-shielding layer 23 may be configured as a laminate of both of the deep-color portions 221 and the light-color portions 222 of red, green, and blue color filters 22. That is, the light-shielding layer 23 shown in FIG. 8 has a configuration of a six-layer laminate composed of the light-color portion 222B of the blue color filter 22B, the deep-color portion 221B of the blue color filter 22B, the light-color portion 222R of the red color filter 22R, the deep-color portion 221R of the red color filter 22R, the light-color portion 222G of the green color filter 22G, and the deep-color portion 221G of the green color filter 22G in that order when viewed from the second substrate 20.

As described above, when the light-shielding layer 23 is formed by laminating not only the deep-color portions 221 of the color filters 22, but also the light-color portions 222, the optical density of the light-shielding layer 23 can be maintained at a high level and, therefore, further excellent contrast of the display can be achieved.

Figure 9:
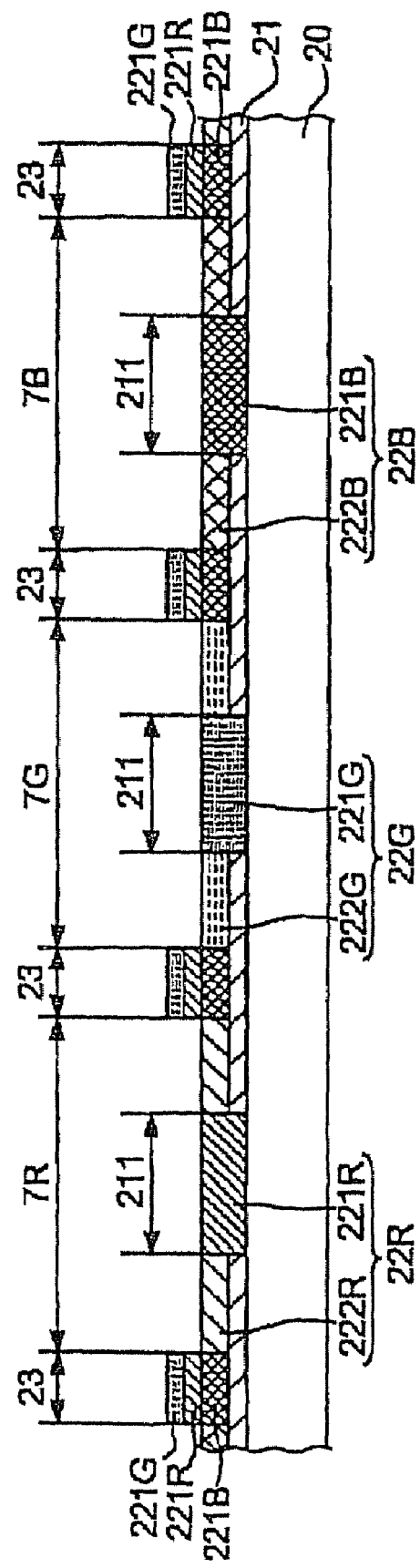
FIG. 9 is a sectional view showing a reflection layer, color filters, and a light-shielding layer of a liquid crystal display panel according to a modified example of the present invention under magnification.

As shown in FIG. 9, the light-shielding layer 23 may be configured as a laminate of only the deep-color portions 221 of the red, green, and blue color filters 22. That is, the light-shielding layer 23 does not necessarily include the light-color portion 222 of any one of the color filters 22. The light-shielding layer 23 shown in FIG. 9 has a configuration of a three-layer laminate composed of the deep-color portion 221B of the blue color filter 22B, the deep-color portion 221R of the red color filter 22R, and the deep-color portion 221G of the green color filter 22G in that order when viewed from the second substrate 20. When the light-shielding layer 23 is formed by laminating only the deep-color portions of the color filters 22 as described above, the thickness of the light-shielding layer 23 can be reduced.

As shown in this modified example, in the present invention, it is essential that the deep-color portions 221 of the color filters 22 of at least a plurality of colors (red, green, and blue) are laminated and, therefore, the light-shielding layer 23 is formed.

C-2 Modified Example 2

In the aforementioned embodiment, the case where the color filters 22 were formed in order of blue→red→green and, in addition, the color filter 22 of each of the colors was formed in order of light-color portion 222→deep-color portion 221 was exemplified. However, the order of formation of the color filters 22 of each of the colors and the deep-color portion 221 and the light-color portion 222 of each color filter 22 are not limited to them. For example, the deep-color portions 221 of each of the red, green, and blue color filters 22 may be formed and, thereafter, the light-color portions 222 of the color filters 22 of each of these colors may be formed. Consequently, the order of the individual layers constituting the light-shielding layer 23 is not limited to that shown in each of the aforementioned embodiments and a modified example.

C-3 Modified Example 3

In each of the aforementioned embodiments, the case where the deep-color portion 221 was formed in the region being superimposed on the translucent portion 211 of the reflection layer 21 in the subpixel 7, while the light-color portion 222 was formed in the region other than that region was exemplified. However, the deep-color portion 221 may reach the region other than the region being superimposed on the translucent portion 211. That is, the deep-color portion 221 may be formed over the region being superimposed on the translucent portion 211 of the reflection layer 21 in the subpixel 7 and a part of the region not being superimposed thereon, while the light-color portion 222 may be formed in the region other than that region. In the present invention, it is essential that the deep-color portion 221 is arranged in order to be superimposed on at least the translucent portion 211 of the reflection layer 21.

C-4 Modified Example 4

In each of the aforementioned embodiments, the liquid crystal display panel of the active matrix system using the TFD element 13, which was a two-terminal switching element, was exemplified. However, as a matter of course, the present invention can be applied to a liquid crystal display panel using a three-terminal switching element exemplified by the TFT (Thin Film Transistor) element and a liquid crystal display panel of the passive matrix system having no switching element. In each of the aforementioned embodiments, the case where a stripe arrangement in which color filters 22 having the same color were arranged in a row was adopted was exemplified. However, in addition to this, a mosaic arrangement and a delta arrangement can also be adopted as the mode of the arrangement of the color filters 22. Accordingly, as long as a color filter substrate is provided with the color filters 22 and the light-shielding layer 23, and a liquid crystal display panel uses this color filter substrate, the present invention can be applied regardless of modes with respect to other constituents.

Electronic Equipment

Next, electronic equipment using the liquid crystal display panel according to the present invention will be described.

D-1. Mobile Type Computer

Figure 10:
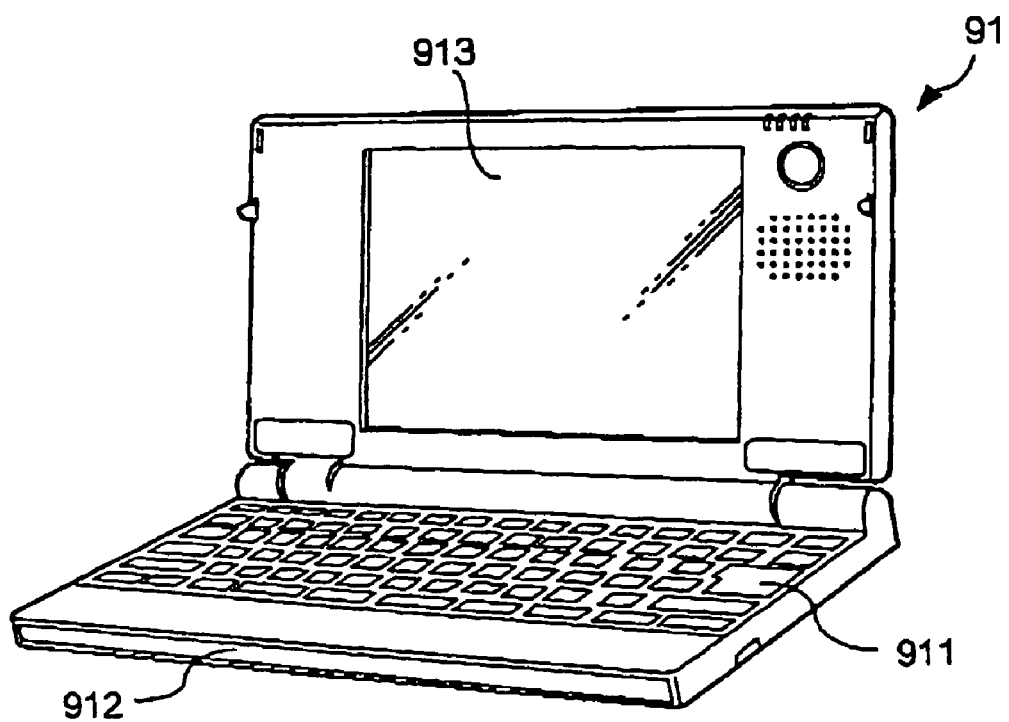
FIG. 10 is a perspective view of the appearance configuration of a personal computer as an example of electronic equipment to which the liquid crystal display panel according to the present invention is applied.

An example, in which the liquid crystal display panel according to the present invention is applied to the display portion of a portable personal computer (so-called notebook personal computer), will be described. FIG. 10 is a perspective view showing the configuration of this personal computer. As shown in FIG. 10, the personal computer 91 is provided with a body portion 912 including a keyboard 911, and a display portion 913, to which the liquid crystal display panel according to the present invention is applied.

D-2. Cellular Phone

Figure 11:
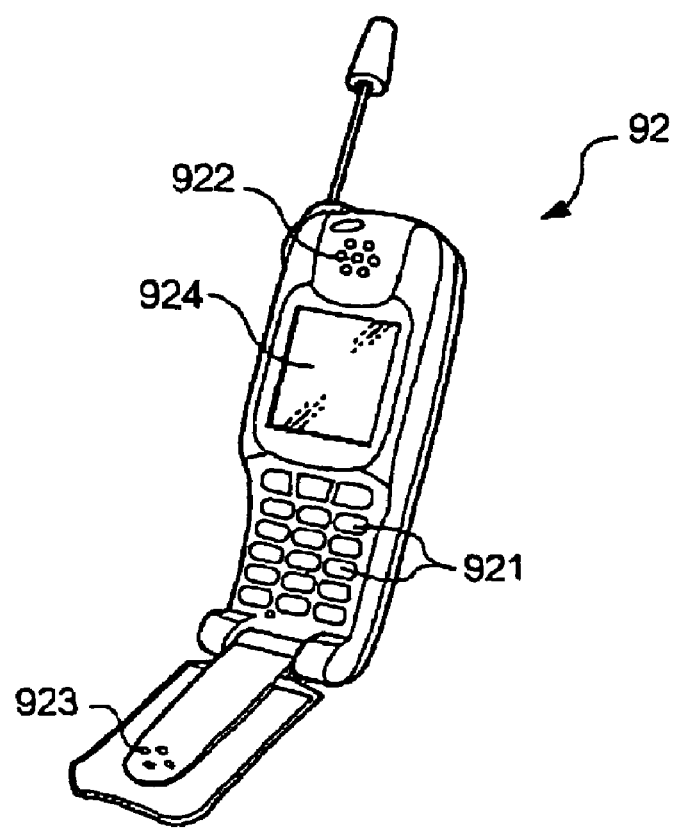
FIG. 11 is a perspective view of the appearance configuration of a cellular phone as an example of electronic equipment to which the liquid crystal display panel according to the present invention is applied.

An example, in which the liquid crystal display panel according to the present invention is applied to the display portion of a cellular phone, will be described. FIG. 11 is a perspective view showing the configuration of this cellular phone. As shown in FIG. 11, a cellular phone 92 is provided with a plurality of operation buttons 921 and, in addition, an earpiece 922, a mouthpiece 923 and, furthermore, a display portion 924, to which the liquid crystal display panel according to the present invention is applied.

Examples of electronic equipment, to which the liquid crystal display panel according to the present invention can be applied, include, for example, liquid crystal televisions, viewfinder type and monitor-direct-view type videotape recorders, car navigation devices, pagers, electronic notepads, desk-top calculators, word processors, work stations, videophones, POS terminals, and digital steel cameras, in addition to the personal computer shown in FIG. 10 and the cellular phone shown in FIG. 11.

As described above, according to the present invention, the chroma in the transmissive display can be improved without loss of the brightness in the reflective display.

What is claimed is:

1. A liquid crystal display panel comprising:
   a first substrate;
   a second substrate facing the first substrate;
   a liquid crystal between the first substrate and the second substrate;
   pixels each including a transmissive display portion and a reflective display region;
   reflectors disposed between the second substrate and the liquid crystal;
   a first color filter arranged on an observation side with respect to the reflectors, the first color filter transmitting light with a wavelength corresponding to a first color, the first color filter including a first deep-color portion and a first light-color portion having an optical density lower than an optical density of the first deep-color portion, the first deep-color portion being located in the transmissive display portion of the corresponding pixel, the first light-color portion being located in the reflective display portion of the corresponding pixel;

a second color filter arranged on the observation side with respect to the reflectors, the second color filter transmitting light with a wavelength corresponding to a second color, the second color filter including a second deep-color portion and a second light-color portion having an optical density lower than an optical density of the second deep-color portion, the second deep-color portion being located in the transmissive display portion of the corresponding pixel, the second light-color portion being located in the reflective display portion of the corresponding pixel; and a light-shielding layer formed of a laminate structure including at least the first deep-color portion, the first deep-color portion included in the light shielding layer being thinner than the first deep-color portion located in the transmissive display portion of the corresponding pixel.

2. The liquid crystal display panel according to claim 1, the light-shielding layer including the first light-color portion as the second or higher layer of the laminate structure in order away from the second substrate, the first light-color portion included in the light shielding layer being thinner than the first light-color portion located in the reflective display portion of the corresponding pixel.

3. The liquid crystal display panel according to claim 1, the first and second color filters and the light-shielding layer being located between the second substrate and the liquid crystal.

4. The liquid crystal display panel according the claim 1, the first and second color filters and the light-shielding layer being located between the first substrate and the liquid crystal.

5. The liquid crystal display panel according to claim 1, the first color filter being for transmitting light with a wavelength corresponding to one of red, green, and blue, optical densities of the first deep-color portion and the first light-color portion being chosen so that, in a CIE chromaticity diagram, an area of color reproduction region of the first deep-color portion is 3.5 to 5 times the area of color reproduction region of the first light-color portion.

6. A liquid crystal display panel comprising:
a first substrate;
a second substrate facing the first substrate;
a liquid crystal between the first substrate and the second substrate;
pixels each including a transmissive display portion and a reflective display region;
reflectors disposed between the second substrate and the liquid crystal;
a first color filter arranged on an observation side with respect to the reflectors, the first color filter transmitting light with a wavelength corresponding to a first color, the first color filter including a first deep-color portion and a first light-color portion having an optical density lower than an optical density of the first deep-color portion, the first deep-color portion being located in the transmissive display portion of the corresponding pixel, the first light-color portion being located in the reflective display portion of the corresponding pixel;
a second color filter arranged on the observation side with respect to the reflectors, the second color filter transmitting light with a wavelength corresponding to a second color, the second color filter including a second deep-color portion and a second light-color portion having an optical density lower than an optical density of the second deep-color portion, the second deep-color portion being located in the transmissive display portion of the corresponding pixel, the second light-color portion being located in the reflective display portion of the corresponding pixel;
a light-shielding layer formed of a laminate structure including at least the first deep-color portion, the first deep-color portion included in the light shielding layer being thinner than the first deep-color portion located in the transmissive display portion of the corresponding pixel; and
a light-shielding layer formed of a laminate structure including the first light-color portion as the second or higher layer of the laminate structure in order away from the second substrate, the first light-color portion included in the light shielding layer being thinner than the first light-color portion located in the reflective display portion of the corresponding pixel.

* * * * *